United States Patent
Kim

(10) Patent No.: US 6,727,476 B2
(45) Date of Patent: Apr. 27, 2004

(54) DEVICE AND METHOD FOR CONTROLLING COOKER

(75) Inventor: Seog Tae Kim, Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/207,984

(22) Filed: Jul. 31, 2002

(65) Prior Publication Data

US 2002/0175162 A1 Nov. 28, 2002

Related U.S. Application Data

(62) Division of application No. 09/689,827, filed on Oct. 13, 2000.

(30) Foreign Application Priority Data

Oct. 16, 1999 (KR) .............................................. 99-44922

(51) Int. Cl.$^7$ ................................................ H05B 1/02
(52) U.S. Cl. ..................... 219/492; 219/497; 219/494; 99/325
(58) Field of Search ................................. 219/492, 493, 219/494, 497, 499, 501, 505, 483–486, 481; 99/325

(56) References Cited

U.S. PATENT DOCUMENTS

| | | | |
|---|---|---|---|
| 4,251,716 A | 2/1981 | Lewis et al. ................ | 219/446 |
| 4,554,440 A | 11/1985 | Lee, Jr. ....................... | 219/501 |
| 5,451,746 A * | 9/1995 | Kadwell et al. ............ | 219/506 |
| 5,490,450 A | 2/1996 | Lee .............................. | 99/337 |
| 5,771,959 A | 6/1998 | Westbrooks Jr. et al. .. | 165/11.1 |
| 5,786,568 A | 7/1998 | McKinney .................. | 219/400 |
| 5,981,916 A | 11/1999 | Griffiths et al. ............. | 219/492 |
| 6,148,258 A * | 11/2000 | Boisvert et al. ............ | 219/492 |
| 6,271,506 B1 * | 8/2001 | Glaser ......................... | 219/505 |
| 6,294,765 B1 | 9/2001 | Brenn ......................... | 219/494 |

FOREIGN PATENT DOCUMENTS

JP 63-169430 7/1988

* cited by examiner

*Primary Examiner*—Mark Paschall
(74) *Attorney, Agent, or Firm*—Fleshner & Kim, LLP

(57) ABSTRACT

Device and method for controlling a heater in a cooker, the device including a plurality of heaters, a relay part for supplying/cutting off a power applied to the heaters, a current detecting part for detecting a current value applied to the heaters, and a controller for controlling the relay part according to the current value detected at the current detecting part and a preset current value, to adjust a preset heater operation time period for the present cooking, thereby improving a quality of cooking by solving a deviation of operation power caused by variation of heaters and/or power by compensating the cooking time period.

20 Claims, 2 Drawing Sheets

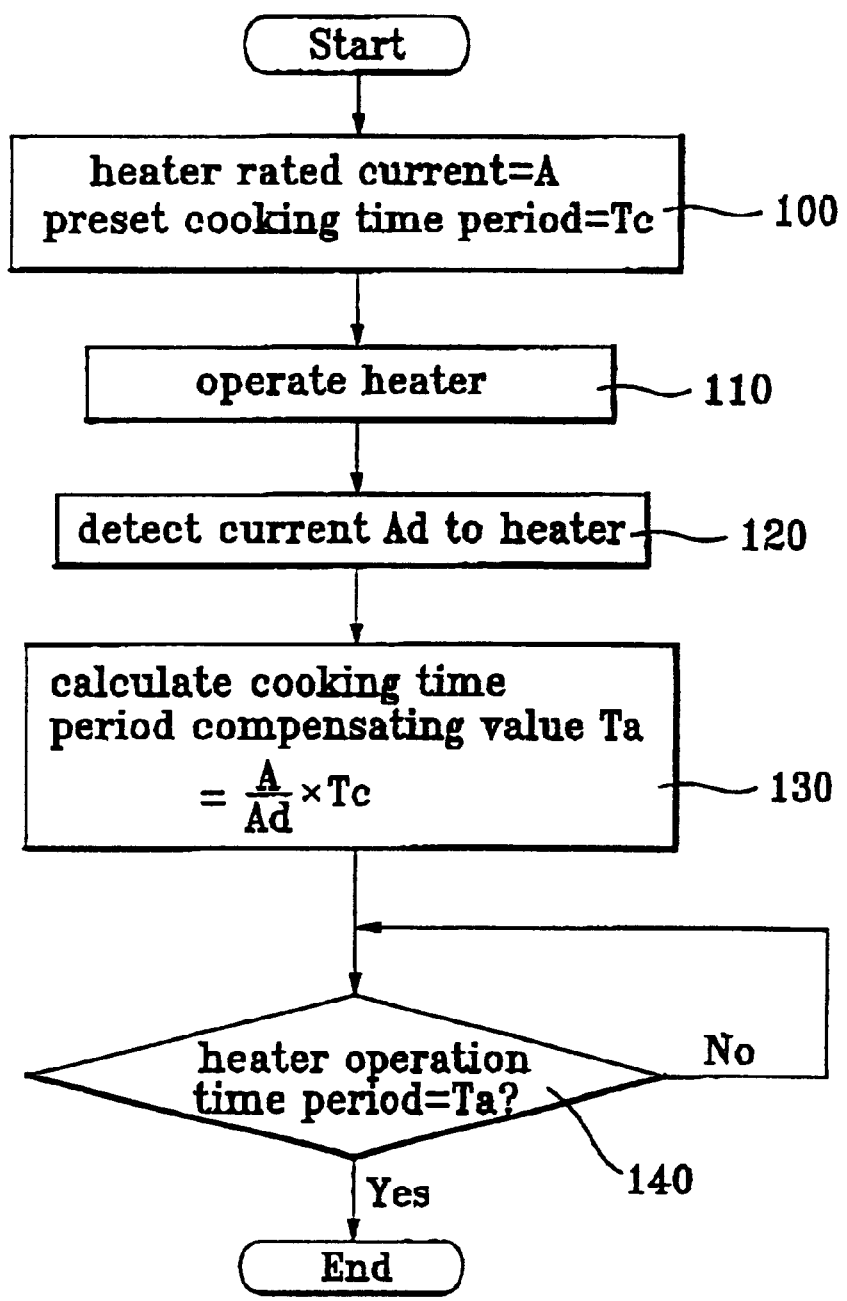

DEVICE AND METHOD FOR CONTROLLING COOKER

This application is a Divisional of application Ser. No. 09/689,827, filed on Oct. 13, 2000.

BACKGROUND OF THE INVENTION

1. Field of the Invention

The present invention relates to a cooker, and more particularly, to device and method for controlling a heater in a cooker.

2. Background of the Related Art

In general, a cooker, such as a gas oven and the like, is provided with a plurality of heaters for heating and cooking food, a system for supplying and cutting off a power to the heater, and control means for controlling the system. And, since a rated power and a required cooking time period are preset for each of cooking courses, if a user selects one of the cooking courses, the heaters are operated to meet the preset rated power and the cooking time period, once the user selects the cooking course. A related art cooker with four heaters will be explained with reference to FIG. 1.

The heaters HTR1~HJR4 are connected in parallel between a power supply terminal and a ground voltage. Bach of the power supply terminals to the heaters HTR1~HTR4 is a relay RY1~RY4 connected in series to each of the heaters. That is, if the first relay RY1 is turned on, a power is supplied to the first heater HTR1, to put the first heater into operation, if the second relay RY2 is turned on, the power is supplied to the second heater HTR2, to put the second heater into operation, and a likely, the third relay RY3 controls a power supply to the third heater HTP3, and the fourth relay RY4 controls a power supply to the fourth heater HTR4. Though not shown, there is controlling means for controlling turn on/off of the relays RY1~RY4. That is, the controlling means determines a power consumption rate of the present cooking, for controlling operation of the relays RY1~RY4. The determination of the power consumption rate of the cooking and the controlling of the relays RY1~RY4 at the controlling means are done with reference to preset values. That is, the cooking control is carried out according to the preset value assuming that the power consumption at each of the heaters are a rated power consumption. For an example, if the rated power consumption of each of the heaters HTR1~HTR4 is 1000W, and the preset cooking value is 3 min. at 4000W, requiring operation of the four heaters HTR1~HTR4 for 30 min, the relays RY1~RY4 are turned on, to apply currents to the heaters HTR1~HTR4, and if the preset cooking value is 10 min, at 4000W, the four relays are operated for 10 min. However, the heaters are not always required to be operative at the rated power consumption. For an example, the heaters may not be operative at 4000W, but approx. 3800W or exceeding the 4000W. Thus, there may be deviations of the operative power, which means that the operative power does not meet a required heating condition, that deteriorates a quality of cooking. For an example, if a heater with ±5% deviation is used in a 5000W oven cooking, an actual power deviation will be ±250W. That is, for a high power model with 4000W and over, a cooking time period of 30 sec., a ±5% cooking time period of 10 min. cooking time period, influences to cooking very much, wherein a less/more heating than required caused by a power deviation for the time period deteriorates a quality of the cooking.

SUMMARY OF THE INVENTION

Accordingly, the present invention is directed to device and method for control a heater in a cooker that substantially obviates one or more of the problems due to limitations and disadvantages of the related art.

An object of the present invention is to provide device and method for controlling a heater in a cooker, which permits to compensate a cooking time adjustment for a deviation of a heater operation power.

Additional features and advantages of the invention will be set forth in the description which follows, and in pal will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for controlling a heater in a cooker includes a plurality of heaters, a relay part for supplying/cutting off a power applied to the heaters, a current detecting part for detecting a current value applied to the heaters, and a controller for controlling the relay part according to the current value detected at the current detecting part and a preset current value, to adjust a preset heater operation time period for the present cooking.

In another aspect of the present invention, there is provided a method for controlling a heater in a cooker having a plurality of heaters, and a cooking time period and a required power preset therein for each cooking, including the steps of (a) operating the heaters consistent to the cooking time period and the required power preset for the presently selected cooking, (b) detecting a current required for operating the heaters, (c) compensating the cooking time period according to the detected current and a preset current, and (d) controlling operation of the heater to be consistent to the compensated cooking time period.

It is to be understood that both the foregoing general description and the following detailed description are exemplary and explanatory and are intended to provide farther explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
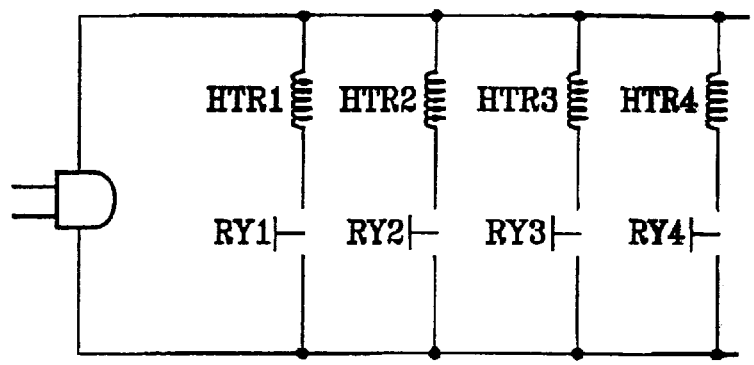
FIG. 1 illustrates a system of heaters in a related art cooker.
Figure 2:
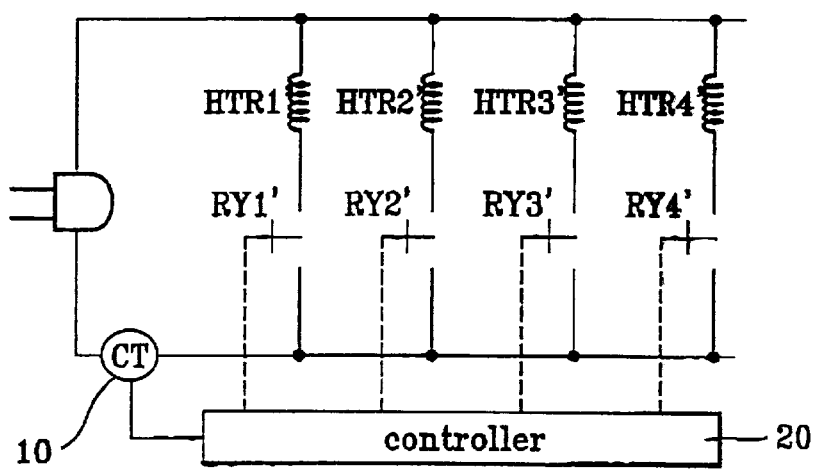
FIG. 2 illustrates a system of a heater controller in a cooker in accordance with a preferred embodiment of the present invention; and, FIG. 3 illustrates a flow chart showing a method for controlling a heater in a cooker in accordance with a preferred embodiment of the present invention.

Reference will now be made in detail to the preferred embodiments of the present invention, examples of which are illustrated in the accompanying drawings. FIG. 2 illustrates a system of a heater controller in a cooker in accordance with a preferred embodiment of the present invention.

Referring to a heater controller in a cooker in accordance with a preferred embodiment of the present invention includes a plurality of heaters HTR1'~HTR4' connected in parallel between a power supply terminal and a ground voltage. Each of the heaters HR1'~HTR4' has a relay RY1'~RY4' connected in series for controlling power supply to the heater. Operation of the relays RY1'~RY4' are controlled by the controller 20. The controller 20 controls turn on/off operation of the relays according to the power used in the cooking. And, there is a current transformer 10 connected to the controller 20 for detecting a current used at the heaters HTR1'~HTR4'.

The operation of the heater controller in a cooker in accordance with a preferred embodiment of the present invention will be explained.

When the present cooking requires operation of all the four relays, power is supplied to the heaters HTR1'~HTR4' as all the relays RY1'~RY4' are turned on under the control of the controller 20. However, when the present cooking does not require operation of all the four relays, the controller 20 controls the relays RY1'~RY4' as many as required for controlling power consumption in the cooking. On the other hand, the current transformer 10 measures a current used by the heaters and provides a measured value to the controller 20 during the heaters are in operation, The controller 20 perceives the present power consumption from the value measured at the current transformer 20.

A method for controlling a heat=in a cooker in accordance with a preferred embodiment of the present invention will be explained with reference to FIG. 3.

Upon known a cooking to be proceeded presently, the controller 20 reads cooking information for the cooking from cooking information stored in a memory. The cooking information includes a cooking time period Tc, a cooking power consumption. cooking temperature, and the like. For convenience of explanation of the present invention, the cooking in the cooker explained hereafter will take a case when all the four heaters are used for an example. Then, the controller 20 reads a preset rated current 'A' of the heaters HTR1'~HTR4' at a rated power of the heaters HTR1'~HTR4' (Step 100). Then, the controller 20 controls to turn on the relays RY1'~RY4' to supply power to the heaters HTR1'~HR4'. Upon supplying the power to the heaters HTR1'~HTR4', the heaters start to operate (Step 110). In this instance, the current transformer 10 detects current Ad used at the heaters HTR1'~HTR4' and provides a detected value to the controller 20 (Step 120). The controller 20 calculates a cooking time period compensation value Ta by using the current value Ad detected in the step 120, the rated current value A of the heater, and the present cooking time period Tc(Step 130). The cooking time period compensation value Ta is calculated in the step 130 by using an equation expressed as below.

Cooking time period compensation value Ta=(rated current A/detected current Ad)*preset cooking time period Tc    (1)

That is, the controller 20 knows a cooling tine period Tc set based on a rated power consumption of 4000W. As the power is proportional to the current (P=IV, where P denotes a power, I denotes a current, and V denotes a voltage). When the power consumed at the heaters is 3800W, a ratio of the detected current Ad to the rated current A is approx. 1.05, the same with an actual power consumption to the rated power A. Therefore, 1.05, the ratio of the detected current Ad to the rated current A, and a preset cooking time period Tc is multiplied, to obtain a compensated cooking time period, i.e., a scheduled operation time period Ta prolonged by 5% compared to the preset cooking time period Tc can be calculated. Opposite to this, if the power consumption at the heater is 4200W, '0.95', the ratio of the detected curet Ad to the rated current A, and a preset cooking ime period Tc is multiplied according to the foregoing principle, to obtain a competed cooking time period, i.e., the scheduled operation time period Ta shortened by 5% compared to the preset cooking time period Tc can be calculated. In other word, if the sensed current is smaller than the rated current, the cooking time period is prolonged in proportion to the ratio, and if the sensed current is greater than the rated current, the cooking time period is shortened in proportion to the ratio. Thus, the cooking time period compensating value Ta is fixed, and the controller 20 controls the relays RY1'~RY4' for the time period Ta, to proceed the cooking.

As has been explained, the device and method for controlling a heater in a cooker can improve a quality of cooking by solving a deviation of operation power caused by variation of heaters and/or power by compensating the cooking time period.

It will be apparent to those skilled in the art that various modifications and variations can be made in the device and method for controlling a heater in a cooker of the present invention without departing from the spirit or scope of the invention. Thus, it is intended that the present invention cover the modifications and variations of this invention provided they come within the scope of the appended claims and their equivalents.

What is claimed is:

1. A method for controlling a heater in a cooker having a plurality of heaters, and a cooking time period and a required power preset therein for each cooking, comprising the steps of:
   (a) operating the heaters consistent to the cooking time period and the required power preset for the presently selected cooking;
   (b) detecting a current required for operating the heaters;
   (c) compensating the cooking time period according to the detected current and a preset current; and,
   (d) controlling operation of the heater to be consistent to the compensated cooking time period.

2. A method as claimed in claim 1, wherein the step (c) includes the step of increasing/decreasing the preset cooking time period as much as a ratio of the detected current to the present current.

3. A method as claimed in claim 1, wherein said compensating the cooking time period according to the detected current and a present current comprises:
   calculating a second time (t2) based upon a first time (t1) entered as the cooking time period, the required power preset (Pr) and said current detected (Cd) in step (b), which is:

$$t2 = \frac{Pr}{Cd} \times t1.$$

4. A method for cooking, comprising:
   setting a first time and a first current for said cooking;
   calculating a desired power use based on said first time and said first current;
   relaying said first current to at least one heater;
   measuring a second current used by said at least one heater;
   calculating a second time based on the desired power use and the second current; and
   adjusting an amount of time for relaying said first current from said first time to said second time.

5. The method of claim 4, wherein said second time (t2) is a function of said first current (c1), said second current (c2) and said first time (t1) as calculated by:

$$t2 = \frac{c1}{c2} \times t1.$$

6. The method of claim 4, further comprising:
setting said first time and said first current in a memory of a controller, wherein said calculating of said second time occurs in a processor of the controller.

7. A cooking device, comprising:
a plurality of heaters;
a relay part communicatively coupled to said plurality of heaters;
a current detector communicatively coupled to said plurality of heaters; and
a controller communicatively coupled to said relay part and said current detector, wherein the controller adjusts a first preset time period to a new second preset time period based upon a current level detected by said current detector in comparison with a first preset current level corresponding said first preset time period.

8. The cooking device of claim 7, wherein said current level detected is a second current level, which in conjunction with said second preset time, applies an equal cooking amount as said first preset current level in conjunction with said first preset time.

9. The cooking device of claim 8, wherein said controller controls said relay part to maintain said current level detected through said plurality of heaters for said second preset time period.

10. The cooking device of claim 9, wherein said controller comprises a memory part that stores said first preset time and first preset current.

11. The cooking device of claim 10, wherein said controller comprises a processor that calculates said second preset time based upon said first preset time, first preset current level and said current level detected.

12. The cooking device of claim 7, wherein said controller comprises a memory part that stores said first preset time and first preset current.

13. The cooking device of claim 7, wherein said controller comprises a processor that calculates said second preset time based upon said first preset time, first preset current level and said current level detected.

14. A device for controlling a heater in a cooker comprising:
a plurality of heaters;
a relay part for supplying/cutting off a power applied to the heaters;
a current detecting part for detecting a current value applied to the heaters;
a controller for controlling the relay part according to the current value detected at the current detecting part and a preset current value; and
a time adjuster for automatically adjusting a preset heater operation time period based on the current value detected, the preset current value and the preset heater operation time period.

15. The device as claimed in claim 14, further comprising a memory part for storing the present current value and the preset heater operation time period.

16. The device of claim 14, wherein said current value detected is a second current level in conjunction with said adjusted preset heater operation time applies an equal cooking amount as said preset current level in conjunction with said preset heater operation time, wherein said controller controls said relay part to apply said current level detected through said plurality of heaters for said adjusted preset heater operation time.

17. The device of claim 14, wherein said controller comprises a memory part that stores said preset heater operation time and a preset current, wherein said controller comprises a processor that calculates said adjusted preset heater operation time based upon said preset time, the preset current and said current level detected.

18. A heating system, comprising:
a plurality of heating elements;
a switching circuit for controlling current supplied to the heating elements;
a detector that detects the current supplied to the heating elements; and
a controller that automatically controls the switching circuit according to a combination of the current detected by the detector, a preset current value and a preset operation time.

19. The system as claimed in claim 18, further comprising a time adjuster that automatically adjusts the preset operation time based on the current detected and the preset current value, wherein the time adjuster substitutes the adjusted preset operation time for the preset operation time for use by the controller.

20. The system as claimed in claim 19, wherein the adjusted preset operation time (Ta) is $$Ta = \frac{A}{Ad} \times Tc$$

where A=preset current value, Ad=current value detected and Tc=preset operation time.

* * * * *